May 31, 1960 P. W. BROWNE 2,938,306
DISC TURNING AND SHARPENING DEVICE
Filed Jan. 16, 1958 2 Sheets-Sheet 1

Paul W. Browne
INVENTOR.
BY Clarence A. O'Brien
and Harvey B. Jacobson
Attorneys May 31, 1960 P. W. BROWNE 2,938,306

DISC TURNING AND SHARPENING DEVICE

Filed Jan. 16, 1958 2 Sheets-Sheet 2

Paul W. Browne
INVENTOR.

BY Clarence A. O'Brien
and Harvey B. Jacobson
Attorneys 2,938,306

DISC TURNING AND SHARPENING DEVICE

Paul W. Browne, Roodhouse, Ill., assignor of fifty-one percent to himself and John C. Andras, jointly, and forty-nine percent to Lloyd Martin and Frank A. Thomas, jointly, all of Winchester, Ill.

Filed Jan. 16, 1958, Ser. No. 709,357

6 Claims. (Cl. 51—104)

The present invention generally relates to a device for sharpening discs such as those employed in cultivating soil and which incorporates a device for rotating the discs while they are being sharpened for facilitating the sharpening operation.

An object of the present invention is to provide a disc turning or rotating and sharpening device in which both the discs rotating structure and the sharpening structure are driven by compressed air with the sharpening device being hand manipulated and the rotating device being supported from the axle or hub of the disc assembly.

A further object of the present invention is to provide a disc turning and sharpening device in which the disc turning device is air operated and provided with movable opposed friction rollers for engagement with opposite surfaces of a disc for rotating one of the discs thereby rotating the entire disc assembly for permitting all of the discs on the assembly to be sharpened by using the sharpening device.

A further important object of the present invention is to provide on the disc rotating and sharpening device, an adjustable structure for orientating the rotating device in proper relation to the axis of rotation of the disc thus bringing into engagement with opposite surfaces of the disc, the driving rollers for rotating the disc.

Other objects of the present invention will reside in its simplicity of construction, ease of operation, ease of assembly with a disc assembly and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 5:
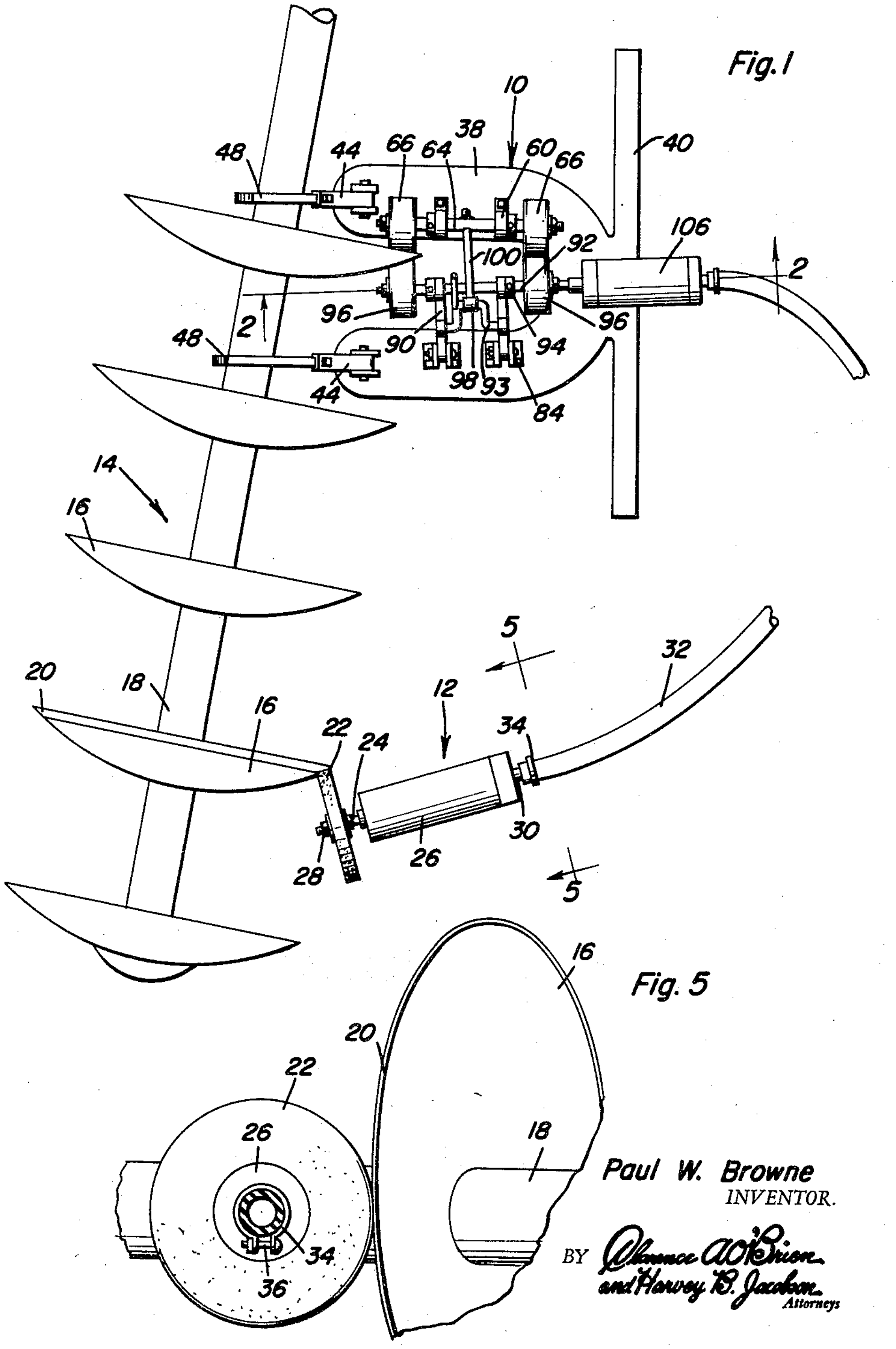
Figure 1 is a plan view of the disc turning and sharpening device of the present invention.
Figures 2, 4:
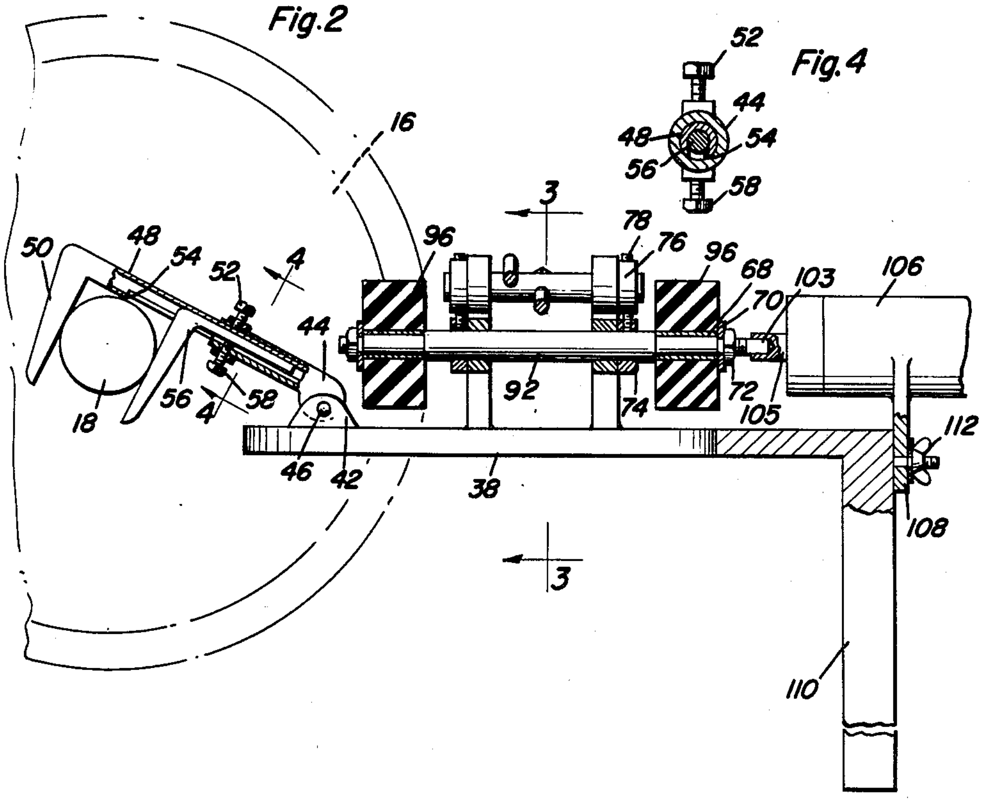
Figure 2 is a longitudinal, sectional view taken substantially upon a plane passing along section line 2—2 of Figure 1 illustrating the details of construction of the disc turning device.
Figure 4 is a detailed sectional view taken substantially upon a plane passing along section line 4—4 of Figure 2 illustrating the adjustment mechanism for the bracket device.
Figure 3:
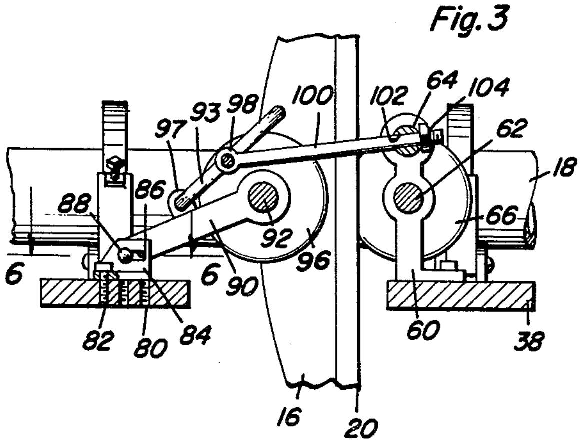
Figure 3 is a transverse sectional view taken substantially upon a plane passing along section line 3—3 of Figure 2 illustrating further structural details of the device.
Figure 6:
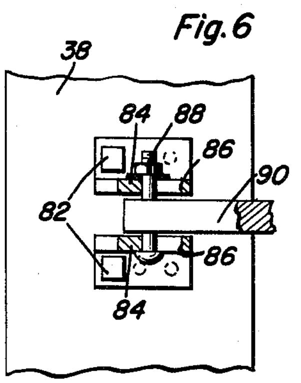

Figure 5 is a detailed sectional view taken substantially upon a plane passing along section line 5—5 of Figure 1 illustrating the construction and relationship of the sharpening device to the disc being sharpened; and Figure 6 is a detailed sectional view taken substantially upon a plane passing along section line 6—6 of Figure 3 illustrating the mounting for one set of rollers whereby they may move relative to the other shaft for clampingly engaging the opposite surfaces of the disc and for bringing the other rollers into frictional driving contact with each other.

Referring now specifically to the drawings, the numeral 10 generally designates the disc turning or rotating device of the present invention while the numeral 12 generally designates the disc sharpening device. The device is illustrated in use with a disc assembly that is generally designated by the numeral 14 and including a plurality of concavo-convex discs 16 mounted upon and rotatable with a central shaft, axle or hub assembly designated by the numeral 18. Each of the discs 16 is sharpened by bevelling the peripheral surface as designated by the numeral 20 on the convex surface of the disc 16. For the purposes of grinding the beveled edge 20, there is provided an abrasive stone 22 which is circular and mounted on the power output shaft 24 of an air motor designated by the numeral 26 and which may be of any conventional construction. The abrasive wheel 22 is removably mounted on the shaft 24 by suitable threaded nuts 28. Also, the air motor 26 is provided with an air inlet line 30 to which is connected by a suitable quick detachable coupling a flexible hose or conduit 32 which permits hand manipulation of the air motor 26 so that the abrasive wheel 22 may be orientated in relation to the disc 16 in the desired manner for sharpening the beveled edge 20 of the disc 16. For purposes of illustration, a U-shaped clamp 34 is shown by securing the hose 32 to the inlet 30 with the clamp 34 being held in position by a clamp bolt 36. However, any suitable quick detachable connection may be connected to the hose 32 for quick engagement and disengagement of the hose 32. The flexible hose 32 permits manipulation of the air motor 26 and the abrasive wheel 22 in any desired manner.

The disc turning device 10 includes a substantially U-shaped plate or frame 38 having an elongated and transversely extending handle 40 at the rear edge thereof. The free ends of the legs of the U-shaped frame 38 receive the periphery of a disc therebetween and the upper surface of each leg thereof is provided with a pair of upwardly extending mounting lugs 42 which pivotally receive an outwardly extending tubular member 44 therebetween with a pivot pin 46 mounting the tubular members 44 to the pairs of lugs 42. The tubular member 44 slidably receives an elongated tubular member 48 having a perpendicularly extending free end 50. A setscrew 52 extends through the tubular member 44 and engages the elongated tubular member 48 for locking the tubular member 48 in adjusted position. The perpendicular end 50 engages the axle 18 on one surface thereof. The tubular member 48 is provided with an elongated groove or slot 54 therein slidably receiving an L-shaped jaw member 56 which is slidably disposed in the elongated member 48 and has a portion extending in parallel relation to the terminal end 50 for engaging the other side of the axle 18 in diametric opposed relation whereby the frame 38 may be orientated in relation to the axle 18 for a purpose described hereinafter. The sleeve 44 is provided with a second setscrew 58 extending therethrough and which extends through the slot 54 into frictional engagement with the L-shaped jaw 56 for locking the same in adjusted position. Thus, the jaws may be adjusted for axles of different diameters and may be adjusted for orientating the axis of the axle 18 in proper angular relation to the longitudinal axis of the U-shaped frame 38.

Mounted on one leg of the U-shaped frame 38 is a pair of upstanding bracket members 60 having a shaft 62 journaled centrally thereon and an upper shaft 64 journaled in the upper end thereof. The shaft 62 is provided with a friction roller 66 at each end thereof with the rollers 66 each being mounted on a sleeve 68 and preferably constructed of hard rubber. The sleeves 68 and rollers 66 are retained on the shaft 62 by washers 70 and threaded nuts 72 on the ends of the shaft 62. Collars 74 are provided on the shaft 62 which are engaged with the outer surfaces of the brackets 60 for orientating the shaft 62 in longitudinal position. The upper shaft 64 is shorter than the lower shaft 62 and is provided with collars 76 on the ends thereof for retaining the upper shaft 64 in the brackets 60. The collars 74 and 76 are removably held in position by setscrews 78 to permit removal of and replacement of the various elements.

The other leg of the U-shaped frame 38 is provided with a series of threaded apertures 80 for receiving a hold-down bolt 82 extending through brackets 84 each of which are provided with an upstanding lug having a horizontal slot 86 therein for receiving a mounting pin 88 extending through a swivel mounting bracket 90 whereby the bracket 90 may hinge about the pivot pin 88 and may also slide as limited by the slot 86 and pin 88. Supported between outer ends of the swingable brackets 90 is a shaft 92 provided with removable collars 94 engaging the outer surfaces of the brackets 90. Each end of the shaft 92 is provided with a friction roller 96 whereby the friction rollers 66 and 96 will be arranged in pairs with one pair being disposed in rolling contact with each other and the other pair disposed in rolling contact with opposite surfaces of the disc 16.

Secured to and projecting rigidly upwardly from each of the pivotal bracket members 90 is a generally U-shaped bail 93 supported from bracket members 90 by lugs 97. Connected pivotally with the center of the U-shaped bail 93 is the eye 98 of a bolt 100 which has the threaded end extending through a bore 102 in the shaft 64 with the outer end of the bolt 100 having a fastener nut 104 thereon whereby rotation of the fastener nut will urge the shafts 92 and 62 towards each other. The slots 86 in brackets 84 will permit sufficient shifting of the mechanism to allow the pair of rollers adjacent the handle 40 to be disposed in frictional driving engagement with each other thus providing two drive rollers with the other pair of rollers drivingly engaging opposite surfaces of the disc 16 thus providing an effective driving and sharpening mechanism.

The end of the driven shaft 92 is provided with a polygonal portion 103 for engagement by the power output member 105 of an air motor 106. The air motor 106 has a laterally extending bracket 108 secured to a depending support handle 110 by a wing nut fastener assembly designated by the numeral 112 thus orientating the motor 106 in relationship to the axis of the shaft 92 and permitting adjustment of the motor 106 so that the same may be disposed in alignment with the shaft 92.

The air powered rotating device is assembled in relation to the disc assembly and adjusted for the particular disc as to the effective length of the brackets on the frame 38 so that all discs having the same degree of concavity may be rotated by the device without further adjusting the same. One pair of rollers is disposed with rollers engaging opposite surfaces of the disc 16 so that rotation of the rollers in opposite directions will cause the disc 16 to be rotated. The other pair of rollers are in frictional contact with each other whereby the two rollers engaging the disc will be rotated at an equal speed. The discs may be replaced as they become worn or may be shifted. Lateral movement of the supporting arms 90 may be accomplished by the particular structure illustrated or by any other initial set up means. The present device not only rotates all of the discs 16 but also provides power for the sharpening wheel 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hand-carried rotating device for a disc assembly including an axle and a plurality of rigidly related discs comprising a supporting frame of generally U-shaped construction having a carrying handle and spaced legs for disposal on opposite sides of a disc, adjustable arm means on said frame for engagement with the axle of the disc assembly for orientating the frame in relation thereto, and means on said frame for frictionally and drivingly engaging opposite surfaces of a disc in direct opposition to each other thereby rotating the disc assembly.

2. The combination of claim 1 wherein said means engaging opposite surfaces of a disc include a pair of rollers of resilient material journaled on said frame for frictional contact with the opposite surfaces of a disc, and means mounted on the frame and connected with said rollers for driving said frictional rollers in opposite directions for rotating all the discs in the assembly in one direction.

3. The combination of claim 2 wherein one of said rollers is movably mounted on said frame for movement towards and away from the other roller.

4. The combination of claim 3 together with a portable abrasive wheel, power means connected with the wheel for rotating said wheel when engaged with a rotating disc for sharpening the disc evenly about the periphery thereof.

5. The combination of claim 4 wherein said driving means includes a second pair of rollers frictionally engaging each other and drivingly connected with the disc engaging rollers for driving both rollers which are in contact with the disc.

6. A portable hand manipulated device for rotating a disc assembly including an axle and a plurality of rigidly related discs, said device comprising a generally U-shaped frame including a bight portion and a pair of legs, handle means rigid with the bight portion of said frame, an arm pivotally attached to each leg of the frame adjacent the outer ends thereof, each arm having means thereon for detachable engagement with axle of the disc assembly, each arm including a longitudinally adjustable portion for varying the relationship between the frame and the disc assembly, a shaft mounted on each leg of the frame, means mounting one of said shafts on a leg of the frame for movement towards and away from the other shaft, a friction wheel journaled on each end of each shaft, the wheels on the ends of the shaft adjacent the bight portion of the frame rollingly engaging each other, the wheels on the other end of the shaft adapted to engage directly opposite portions of the surfaces of a disc of the disc assembly, means interconnecting the shafts for urging the shafts and wheels mounted thereon towards each other for frictional engagement, and means on one end of one shaft for engagement by a power device for driving the shafts, wheels and the disc assembly.

References Cited in the file of this patent

UNITED STATES PATENTS

| | | |
|---|---|---|
| 2,477,361 | Browne | July 26, 1949 |
| 2,597,325 | Hodges | May 20, 1952 |
| 2,742,742 | Barrett | Apr. 24, 1956 |